United States Patent
Pedersen

(10) Patent No.: US 10,114,941 B2
(45) Date of Patent: Oct. 30, 2018

(54) SYSTEMS AND METHODS FOR AUTHENTICATING FIRMWARE STORED ON AN INTEGRATED CIRCUIT

(71) Applicant: Altera Corporation, San Jose, CA (US)

(72) Inventor: Bruce B. Pedersen, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 78 days.

(21) Appl. No.: 15/246,405

(22) Filed: Aug. 24, 2016

(65) Prior Publication Data

US 2018/0060561 A1 Mar. 1, 2018

(51) Int. Cl.
| | | |
|---|---|---|
| *H04L 9/32* | (2006.01) | |
| *G06F 21/44* | (2013.01) | |
| *G06F 21/56* | (2013.01) | |
| *G06F 21/57* | (2013.01) | |
| *G06F 21/72* | (2013.01) | |
| *G06F 21/76* | (2013.01) | |

(52) U.S. Cl.
CPC ............ *G06F 21/44* (2013.01); *G06F 21/562* (2013.01); *G06F 21/572* (2013.01); *G06F 21/72* (2013.01); *G06F 21/76* (2013.01); *H04L 9/3247* (2013.01); *G06F 2221/033* (2013.01); *H04L 2209/08* (2013.01)

(58) Field of Classification Search
None
See application file for complete search history.

(56) References Cited

U.S. PATENT DOCUMENTS

| | | | |
|---|---|---|---|
| 6,742,117 B1 * | 5/2004 | Hikita | .................. G06Q 20/341 235/375 |
| 8,265,272 B2 | 9/2012 | Schneider | |
| 8,566,791 B2 | 10/2013 | Vadekar | |
| 8,620,881 B2 | 12/2013 | Chamberlain et al. | |

(Continued)

OTHER PUBLICATIONS

"The Keyed-Hash Message Authentication Code (HMAC)", Federal Information Processing Standards Publication, Mar. 6, 2002, National Institute of Standards and Technology, Gaithersburg, MD, 2002.

(Continued)

*Primary Examiner* — David Le
(74) *Attorney, Agent, or Firm* — Tianyi He

(57) ABSTRACT

The invention discloses a method of authenticating data stored in an integrated circuit. The method includes storing randomized data in the integrated circuit such that the randomized data occupies each address space of the memory circuit that is not occupied by the stored data. The method also includes generating a first digital signature using the integrated circuit in response to authenticating a concatenation of the stored data and the first copy of randomized data. The method further includes generating a second digital signature in response to authenticating concatenation of a manufacturer-provided copy of the stored data and the second copy of randomized data using a computer-implemented authentication application and authenticating the data stored in the integrated circuit according to whether the first signature matches the second signature.

20 Claims, 7 Drawing Sheets

(56) References Cited

U.S. PATENT DOCUMENTS

| | | |
|---|---|---|
| 8,687,800 B2 | 4/2014 | Patel |
| 8,843,762 B2 | 9/2014 | Pastoriza et al. |
| 2004/0019796 A1 | 1/2004 | Wang |
| 2004/0049687 A1* | 3/2004 | Orsini ..................... G06F 21/31 713/189 |
| 2005/0210179 A1* | 9/2005 | Walmsley ............ B41J 2/04505 711/3 |
| 2006/0253708 A1* | 11/2006 | Bardouillet ............. G06F 21/79 713/176 |
| 2008/0301457 A1* | 12/2008 | Uesugi .................. G06F 21/645 713/178 |
| 2014/0047241 A1 | 2/2014 | Kato et al. |
| 2014/0365779 A1 | 12/2014 | Brown et al. |
| 2016/0080146 A1 | 3/2016 | Gauravaram |
| 2016/0171205 A1* | 6/2016 | Bauer ..................... G06F 21/44 726/26 |

OTHER PUBLICATIONS

"Security Requirements for Cryptographic Modules", Federal Information Processing Standards Publication, May 25, 2001, National Institute of Standards and Technology, Gaithersburg, MD, 2001.

* cited by examiner

SYSTEMS AND METHODS FOR AUTHENTICATING FIRMWARE STORED ON AN INTEGRATED CIRCUIT

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A programmable logic device (PLD), for example a field programmable gate array (FPGA), is an integrated circuit consisting of programmable logic blocks and programmable routing. This programmable logic and routing can be configured with a configuration bitstream that can be loaded into the PLD from an external source. For modern PLDs, this configuration is mediated by one or more programmable processors and associated firmware embedded in the PLD. Many PLDs, including FPGAs, also typically include addressable Random Access Memory (RAM) and Read-Only Memory (ROM) associated with these processors and embedded firmware. For example, the ROM may contain processor instructions and other associated data that allows the FPGA to go through an initial boot process, and that boot process may include loading the RAM with additional processor instructions or associated data from an external source (such as header data contained in the external bitstream). The embedded ROM code or firmware may also contain instructions for performing security checks (such as calculating elliptic-curve signing algorithms for authentication), or code for preforming debug and self-check operations.

It is very important for PLD users to protect the embedded firmware from tampering or hacking. Furthermore, PLDs are often incorporated in equipment that requires a high-level of security (such as military and financial applications), which make them targets for attacks by hackers and other malicious entities. A common method of attacking the PLD would be to surreptitiously embed malicious software or code that may be executed by the processors in the PLD. For example in an FPGA, this malicious software might be inserted into the FPGA's ROM by manipulating the masks used to program the ROM, or by directly manipulating the ROM bits of individual devices as they pass through the supply channel (such as by using laser probes or Focused Ion Beam technology). From an attacker's perspective, it may be much easier to tamper with the device—and to make the devices do what the attacker desires—by tampering with the embedded code on the device, as compared to tampering with the logic gates in the device.

Thus, a key component of securing PLDs is to ensure that the embedded firmware is secure against intrusion. Current solutions to protect PLDs against intrusion rely on programming a unique identification (ID) into the device, and reading that ID via a Joint Test Action Group (JTAG) command. However, for a PLD that is fully controlled by internal processors, unique IDs or other such JTAG responses can be easily spoofed, and cannot ensure that a device does not contain malicious code. Other security measures include public-key authentication of the external boot code, but a public-key can also be easily spoofed, for example if the attacker has already inserted Trojan software into the embedded ROM firmware of an FPGA responsible for authentication. In some cases, possibly by attacking certain debug facilities of the device, the malicious code might be stored into the RAM of a FPGA or another PLD. Therefore, there is a long felt need to develop a method of detecting if an attacker is already inside the firmware or the "security envelope" of a PLD.

SUMMARY

Embodiments described herein include methods of generating an authentication signature and an integrated circuit for generating an authentication signature. It should be appreciated that the embodiments can be implemented in numerous ways, such as a process, an apparatus, a system, a device, or a method. Several embodiments are described below.

In one embodiment, a method of authenticating a stored data in an integrated circuit is disclosed. The method may include an operation to send a first copy of a randomized data to a memory circuit in the integrated circuit using a computer-implemented randomized data generation application such that the first copy of the randomized data occupies each address of the memory circuit not occupied by the stored data. The method may also include an operation to generate a first digital signature in response by performing a cryptographic operation on a concatenation of the stored data and the first copy of the randomized data using a cryptographic circuit on the integrated circuit. The method may further include an operation to generate a second digital signature by performing the cryptographic operation on a concatenation of a clean copy of the stored data and a second copy of the randomized data using a computer-implemented authentication application. The method may include an operation to determine whether the first digital signature matches the second digital signature using a computer-implemented comparison application.

In an embodiment, the method may further include an operation to configure the integrated circuit according to the stored data in response to determining that the first digital signature matches the second digital signature.

In an embodiment, the method may further include an operation to report the second integrated circuit as defective using a computer-implemented reporting application in response to determining that the first digital signature does not match the second digital signature.

In another embodiment, an integrated circuit for generating a digital signature is disclosed. The integrated circuit may further include a processing circuit. The integrated circuit may also include a memory circuit such that the memory circuit comprises a stored data and a randomized data and wherein the randomized data occupies each uninitialized address that is not occupied by the stored data. The method may also include a cryptographic circuit that executes a cryptographic function on a concatenation of the stored data and the randomized data to generate a digital signature.

In still another embodiment, a method of authenticating a stored data is disclosed. The method may include an operation to send a first copy of a randomized data to a memory circuit in an integrated circuit using a computer-implemented randomized data generation application such that the first copy of the randomized data occupies each address of the memory circuit not occupied by the stored data. The method may also include another operation to receive a first concatenation of the stored data and the first copy of the randomized data from the integrated circuit using a computer-implemented authentication application. The method may further include an operation to determine whether the first concatenation matches a second concatenation of a clean copy of the stored data and a second copy of the randomized data using a computer-implemented authentication application such that the clean copy is provided by a manufacturer of the integrated circuit. The method may include an operation to determine whether the first concatenation matches the second concatenation using a computer-implemented comparison application.

Further features of the invention, its nature, and various advantages will be more apparent from the accompanying drawings and the following detailed description of the preferred embodiments.

DETAILED DESCRIPTION OF THE DRAWINGS

Embodiments of the present invention relate to integrated circuits with logic circuitry. The integrated circuits may be any suitable type of integrated circuit, such as microprocessors, application-specific integrated circuits, digital signal processors, memory circuits, or other integrated circuits. If desired, the integrated circuits may be programmable integrated circuits that contain programmable logic circuitry. The present invention will generally be described in the context of integrated circuits such as programmable logic device (PLD) integrated circuits as an example. In the following description, the terms 'circuitry' and 'circuit' are used interchangeably.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of other features. However, any individual feature may not address any of the problems discussed above or might only address one of the problems discussed above. Some of the problems discussed above might not be fully addressed by any of the features described herein.

Figure 1:
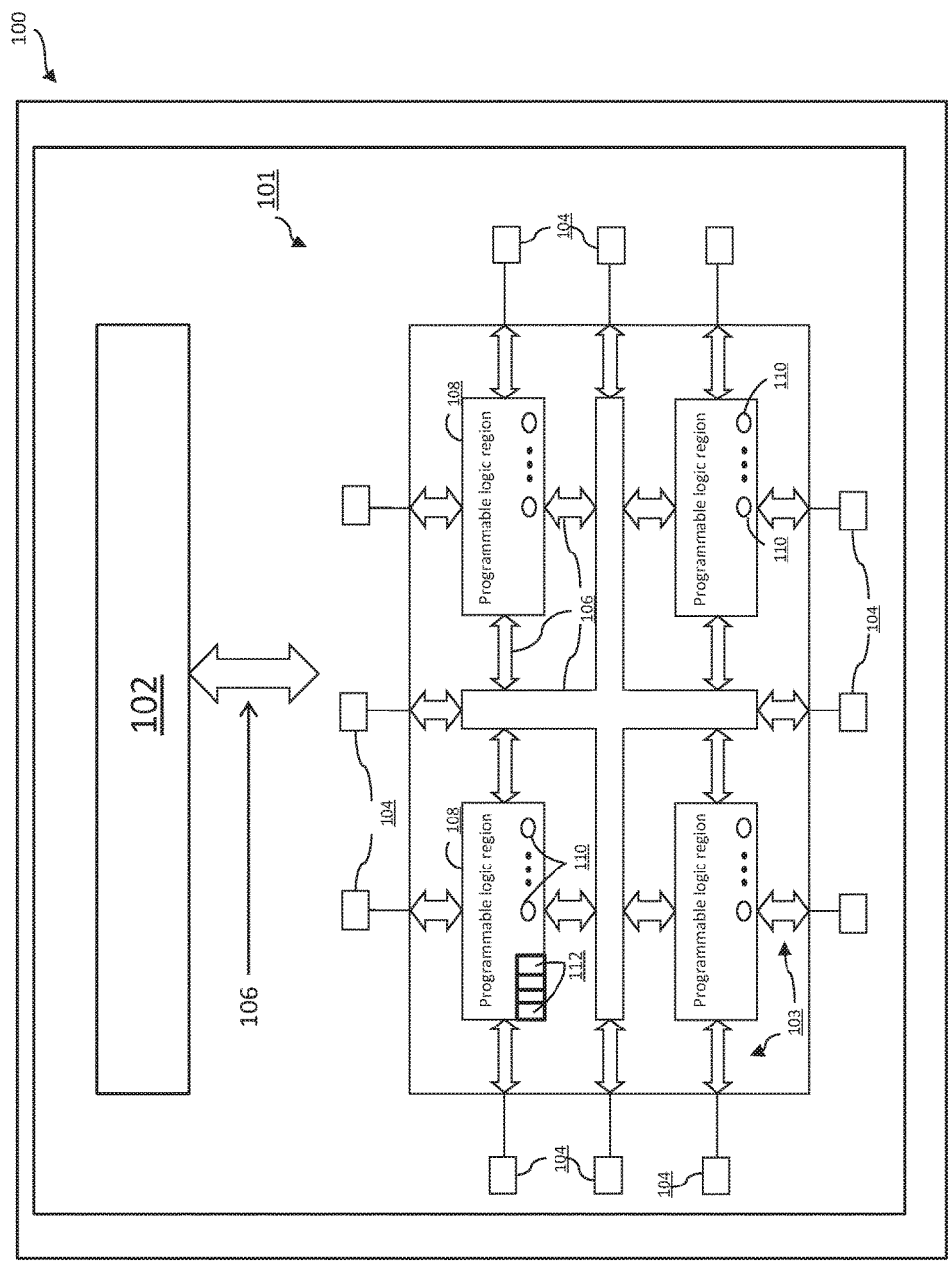
FIG. 1 illustrates an exemplary integrated circuit in accordance with an embodiment of the present invention.

FIG. 1 illustrates an example integrated circuit 100 in accordance with an embodiment of the present invention. In FIG. 1, integrated circuit 100 may include processing circuitry 102 communicatively coupled to a programmable logic device (PLD) circuit 101 via interconnection circuitry 106. Processing circuitry 102 may be a central processing unit (CPU), a microprocessor, a floating-point coprocessor, a graphics coprocessor, a hardware controller, a network controller, a Reduced Instruction Set Computing (RISC) based processor such as an Acorn RISC Machine (ARM) processor, or other processing unit.

PLD circuit 101 may include input-output circuitry 103 for driving signals off of PLD circuit 101 and for receiving signals from other devices via input-output pins 104. Interconnect circuitry 106 may include interconnection resources such as global and local vertical and horizontal conductive lines and buses may be used to route signals on PLD circuit 101. The interconnect circuitry 106 includes conductive lines and programmable connections between respective conductive lines and is therefore sometimes referred to as programmable interconnects.

The interconnect circuitry 106 may form a network-on-chip (NOC). A NOC may be a system of interconnect resources such as multiplexers and de-multiplexers that applies general networking technologies to connect the processing circuitry 102 with PLD circuit 101 and to route signals on PLD circuit 101. The NOC may perform network communication functions. For example, the NOC may perform routing functions, gateway functions, protocol or address translation, and security functions.

PLD circuit 101 may include programmable logic regions 108 that can be configured to perform custom logic functions. Programmable logic region 108 may include combinational and sequential logic circuitry, for example. The interconnect circuitry 106 may be considered to be a type of programmable logic 108.

PLD circuit 101 may also contain programmable memory elements 110. Programmable memory elements 110 can be loaded with configuration data (also called programming data) using pins 104 and input-output circuitry 103. Once loaded, the programmable memory elements 110 may each provide a corresponding static control signal that controls the operation of an associated logic component in programmable logic 108. In a typical scenario, the outputs of the loaded programmable memory elements 110 are applied to the gates of metal-oxide-semiconductor transistors in programmable logic 108 to turn certain transistors on or off and thereby configure the logic in programmable logic region 108 and routing paths. Programmable logic circuit elements that may be controlled in this way include pass transistors, parts of multiplexers (e.g., multiplexers used for forming routing paths in interconnect circuitry 106), look-up tables, logic arrays, various logic gates, etc.

Programmable memory elements 110 may be implemented using any suitable volatile and/or non-volatile memory structures such as random-access-memory (RAM) cells, fuses, antifuses, programmable read-only-memory memory cells, mask-programmed and laser-programmed structures, resistive memory structures, combinations of these structures, etc. Because programmable memory elements 110 are loaded with configuration data during programming, programmable memory elements 110 are sometimes referred to as configuration memory, configuration RAM (CRAM), or programmable memory elements.

The circuitry of PLD circuit 101 may be organized using any suitable architecture. As an example, the logic of PLD circuit 101 may be organized in a series of rows and columns of larger programmable logic regions 108 each of which contains multiple smaller logic blocks 112. The smaller logic blocks may be, for example, regions of logic that are sometimes referred to as logic elements (LEs), each containing a look-up table (LUT), one or more registers, and programmable multiplexer circuitry. The smaller regions may also be, for example, regions of logic that are sometimes referred to as adaptive logic modules (ALMs). Each adaptive logic module may include a pair of adders, a pair of associated registers and a look-up table or other block of shared combinational logic (as an example). The larger regions may be, for example, logic array blocks (LABs) containing multiple logic elements or multiple ALMs. In the example of FIG. 1, illustrative smaller logic blocks 112 (which may be, for example, LEs or ALMs) are shown in one of the larger regions of programmable logic 108 in FIG. 1 (which may be, for example, a logic array block). In a typical PLD circuit 101, there may be hundreds or thousands of smaller logic blocks 112. The smaller logic blocks 112 that are shown in FIG. 1 are merely illustrative.

During device programming, configuration data that configures the smaller logic blocks 112 and programmable logic regions 108, so that their logic resources perform desired logic functions on their inputs and produce desired output signals, is loaded into PLD circuit 101. For example, CRAM cells are loaded with appropriate configuration data bits to configure adders and other circuits on PLD circuit 101 to implement desired custom logic designs.

The resources of PLD circuit 101, such as programmable logic 108, may be interconnected by programmable interconnects 106. Programmable interconnects 106 generally include vertical and horizontal conductors. These conductors may include global conductive lines that span substantially all of device 101, fractional lines such as half-lines or quarter lines that span part of PLD circuit 101, staggered lines of a particular length (e.g., sufficient to interconnect several logic array blocks or other such logic areas), smaller local lines, or any other suitable interconnection resource arrangement. If desired, the logic of PLD circuit 101 may be arranged in more levels or layers in which multiple large regions are interconnected to form still larger portions of logic. Still other device arrangements may use logic that is not arranged in rows and columns.

In addition to the relatively large blocks of programmable logic that are shown in FIG. 1, PLD circuit 101 generally also includes some programmable logic associated with the programmable interconnects, memory, and input-output circuitry on PLD circuit 101. For example, input-output circuitry 103 may contain programmable input and output buffers. Programmable interconnects 106 may be programmed to route signals to a desired destination.

Figure 2:
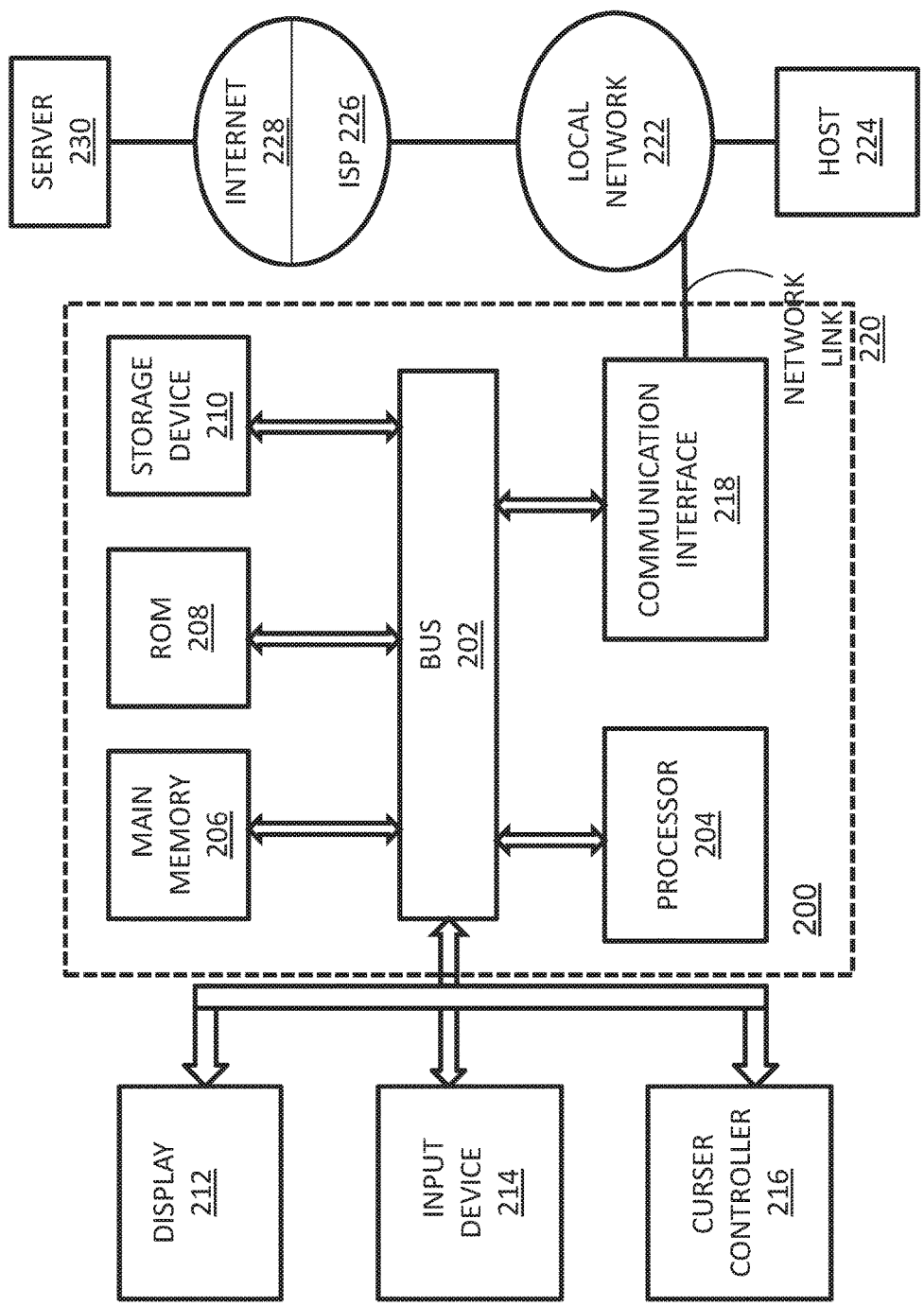
FIG. 2 illustrates an exemplary computer system upon which an embodiment may be implemented.

FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general-purpose microprocessor. In an embodiment, processor 204 may be similar to processing circuitry 102 described above.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions. Computer system 200 may be coupled via bus 202 to a display 212, such as a cathode ray tube (CRT), a liquid crystal display (LCD), plasma display, light emitting diode (LED) display, or an organic light emitting diode (OLED) display for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information. Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

Figure 3:
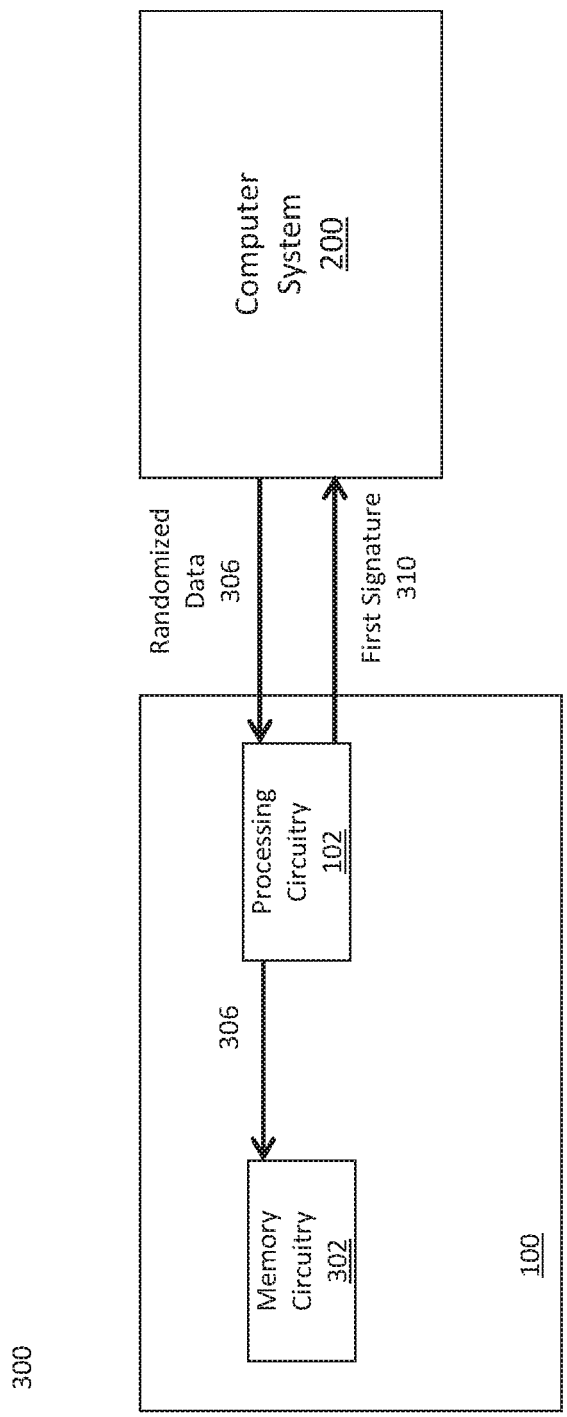
FIG. 3 illustrates an exemplary authentication system for authenticating data stored on an integrated circuit in accordance with an embodiment of the present invention.

FIG. 3 illustrates an exemplary authentication system 300 for authenticating data stored on integrated circuit 100 in accordance with an embodiment of the present invention. For the purposes of illustrating clear examples, FIG. 3 will be discussed in reference to integrated circuit 100 of FIG. 1 and computer system 200 of FIG. 2.

In an embodiment, the data stored on memory circuit 302 may be firmware or ROM code. This firmware is prone to hacking attacks from malicious users. Therefore, the authenticity of the firmware needs to be determined during the boot sequence or process prior to configuring integrated circuit 100 based on the firmware stored in memory circuit 302. In an embodiment, authentication system 300 is used to authenticate the firmware stored in memory circuit 302.

Referring again to FIG. 3, authentication system 300 may include integrated circuit 100 communicatively coupled to computer system 200. For example, integrated circuit 100 may be connected to computer system 200 via communication interface 218 or bus 202. Integrated circuit 100 may further include processing circuitry 102 communicatively coupled with memory circuit 302. In an embodiment, memory circuit 302 is similar to programmable memory elements 110 described elsewhere in this application. In an embodiment disparate memory types (for example ROM, RAM, and registers) that may form the programmable memory elements 110, may be unified into a single logical address space represented by memory circuit 302. In an embodiment, a portion of the address space of memory circuit 302 is occupied by data such as configuration bitstream or firmware.

Referring again to FIG. 3, computer system 200 generates and sends randomized data 306 to processing circuitry 102 of integrated circuit 100. Processing circuitry 102 receives randomized data 306 and sends it to memory circuit 302. In an embodiment, randomized data 306 is stored in memory circuit 302 such that randomized data occupies each previously unoccupied address of memory circuit 302. In an embodiment, randomized data 306 includes randomized bit patterns generated by applications in computer system 200 and sent to processing circuitry 302 to be written to uninitialized addresses of memory circuit 302. In an alternative embodiment, randomized data 306 may be generated by circuitry within processing circuitry 102 of device 100. In still another embodiment, a manufacturer of the integrated circuit 100 may initialize ROM in memory circuit 302 with some randomized data at the time of manufacture. In an embodiment, the initialization of RAM in memory circuit 302 is performed prior to authentication of integrated circuit 100 by filling the RAM locations with randomized data.

After randomized data 306 is used to flood, to fill up, or is written to all uninitialized addresses in memory circuit 302, processing circuitry 102 may perform a cryptographic authentication operation on a concatenation of the firmware stored in memory circuit 302 and randomized data 306 to generate first signature 310. For example, processing circuitry 102 may utilize specialized circuitry to execute a key-hashed message authentication code (HMAC) function to generate a first message authentication code (MAC), which is first signature 310. Processing circuitry 102 may use a secret key received from computer system 200 along with the concatenation of randomized data 306 and embedded firmware stored on memory circuit 302 to execute the HMAC function. In an embodiment, first signature 310 is then transmitted to computer system 100.

Simultaneously or in parallel to generating first signature 310, another cryptographic authentication operation is performed on a concatenation of a copy of the firmware and a copy of randomized data 306 by computing system 200 to generate a second signature. In an embodiment, the copy of firmware used for the second cryptographic authentication operation may be obtained from a manufacturer of integrated circuit 100 or other trusted source to ensure that the copy is untampered and secure. Computer system 200 then compares first signature 310 to the second signature.

If the firmware stored in memory circuit 302 is untampered, secure, or pristine, then the first signature 310 will match the second signature and the embedded firmware is authenticated successfully. However, if first signature 310 does not match the second signature then the embedded firmware may have been modified, hacked, or tampered with and is therefore not secure.

Figure 4:
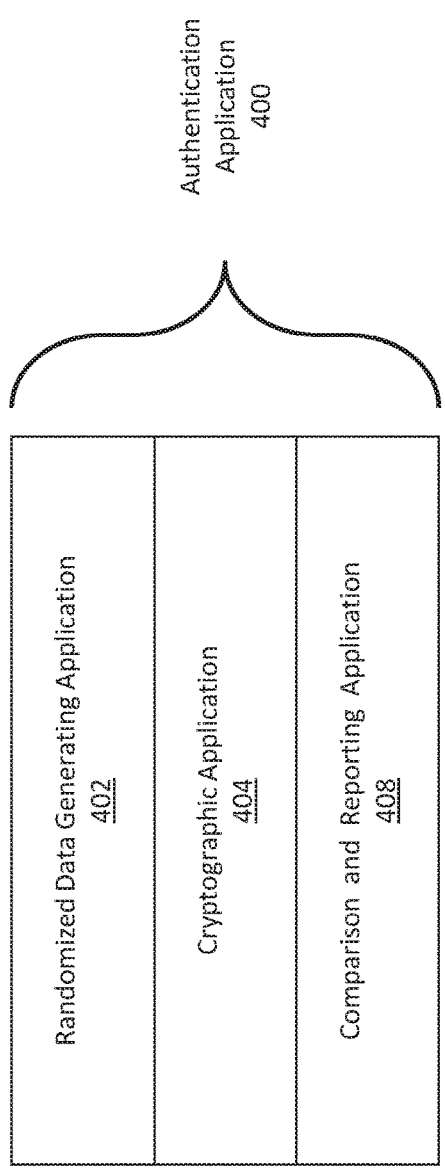
FIG. 4 illustrates an exemplary authentication application implemented on a computer system in accordance with an embodiment of the present invention.

FIG. 4 illustrates authentication application 400 implemented on computer system 200 in accordance with an embodiment of the present invention. For the purposes of illustrating clear examples, FIG. 4 will be discussed in reference to authentication system 300 of FIG. 3.

Referring now to FIG. 4, authentication application 400 may be implemented as specialized software or circuitry on computer system 200 to authenticate the embedded firmware stored on integrated circuit 100. Authentication application 400 may also be implemented as a part of software suite or application used for configuring integrated circuit 100. For example, authentication application 400 may be a software module of a computer aided design (CAD) application or electronic design automation (EDA) application for generating configuration bitstream for a FPGA. In an embodiment, authentication application 400 generates randomized data for an authentication operation to be performed by integrated circuit 100. In addition, authentication application 400 may also perform an independent authentication operation on a concatenation of a copy of the generated randomized data and a copy of the embedded data (or firmware stored in memory circuit 302 of integrated circuit 100) as received from the manufacturer. In an embodiment, authentication application 400 may further include submodules such as randomized data generating application 402, cryptographic application 404, comparison application 408, and reporting application 410. Persons skilled in the art would appreciate that authentication application 400 may be implemented with any combination of the above-mentioned submodules on computer system 200.

Randomized data generating application 402 may be a software module for generating random or pseudo random data in the form of random patterns of ones and zeroes (i.e. random bit patterns) to occupy the portion of address space of memory circuit 306 that is not occupied by the stored data (or firmware). Randomized data generating application 402 may send a first copy of random data 308 to memory circuit 306. Since the random data occupies all of the unused memory space of memory circuit 306, the concatenation of randomized data 306 and embedded firmware is non-compressible. Therefore, no other (potentially malicious) data can be added to memory circuit 306 without re-writing, over-writing, erasing, or modifying either the random data or the stored data (i.e. embedded firmware) in memory circuit 306. In an embodiment, randomized data generating application 402 may generate a non-compressible bit pattern from a random number generator, or a cryptographic pseudo random number generator seeded by a random key or a key that would not be known to a malicious user or attacker or otherwise stored on integrated circuit 100. Examples of techniques to implement a cryptographic pseudo random number generator may be given by a standardization authority such as the Federal Information Processing Standards (FIPS), for example.

Persons having ordinary skill in the art will appreciate that a random or pseudo random number generator may be implemented using a variety of well-known techniques.

Cryptographic application 404 may be implemented as a software submodule of authentication application 400 to perform a second cryptographic authentication operation on a concatenation of a copy of randomized data 306 and copy of embedded firmware or data stored in memory circuit 302 by processing circuitry 102. For example, cryptographic application 404 may compute a second MAC or a second signature based on cryptographic authentication of a concatenation of a clean, untampered, or pristine copy of embedded firmware and a copy of randomized data 306 using the key sent to processing circuitry 102.

Comparison and reporting application 408 may be implemented as a software submodule of authentication application 400 to compare first signature 310 and the second signature and report the result of the comparison. Since, the copy of the embedded firmware used for the second cryptographic authentication is obtained from a trusted source, for example a manufacturer of integrated circuit 100, the copy is assumed as secure. Thus, the second signature is an expected value or result of performing a cryptographic authentication operation on a non-compressible concatenation of a secured or untampered copy of the embedded firmware and a copy of randomized data 306. Therefore, comparison and reporting application 404 can match first signature 310 to the second signature to determine if the embedded firmware stored in memory circuit 302 is secure. If the signatures match, the embedded firmware stored in memory circuit 302 is secure and integrated circuit 100 may proceed with the boot sequence or process for PLD circuit 101.

In an embodiment, the verified embedded firmware stored in memory circuit 302 may be used to configure PLD circuit 101. In an alternative embodiment, comparison and reporting application 408 may determine that the embedded firmware stored in memory circuit 302 is not secure by comparing the time take to perform the first cryptographic authentication operation by processing circuitry 102 of integrated circuit 100 and the second cryptographic authentication operation performed by computer cryptographic application 404. For example, if the first cryptographic authentication operation takes an unusually long time to yield a first signature 310 that matches the second signature then comparison and reporting application 408 may report that the embedded firmware stored in memory circuit 302 is compromised. Similarly, if the first cryptographic authentication operation is never completed then comparison and reporting application 408 may report that the embedded firmware stored in memory circuit 302 is compromised. A person skilled in the art would appreciate that the time taken to complete the first and second cryptographic authentication operations will depend upon the specification, performance, hardware and software capabilities, and hardware and software platforms of integrated circuit 100 and computing system 200 respectively.

Figure 5B:
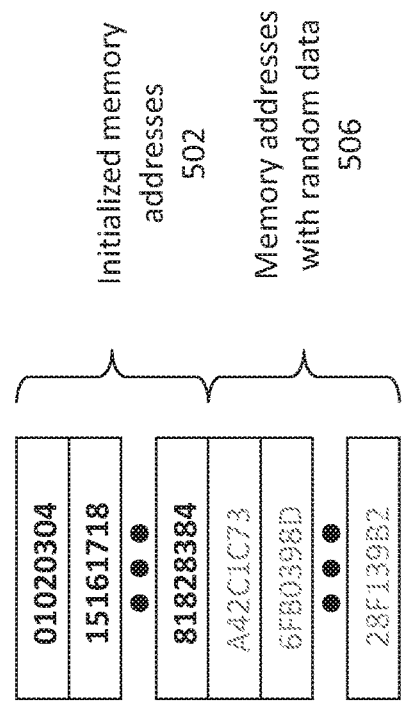
FIGS. 5A and 5B illustrate exemplary memory circuits in accordance with an embodiment of the present invention.
Figure 5A:
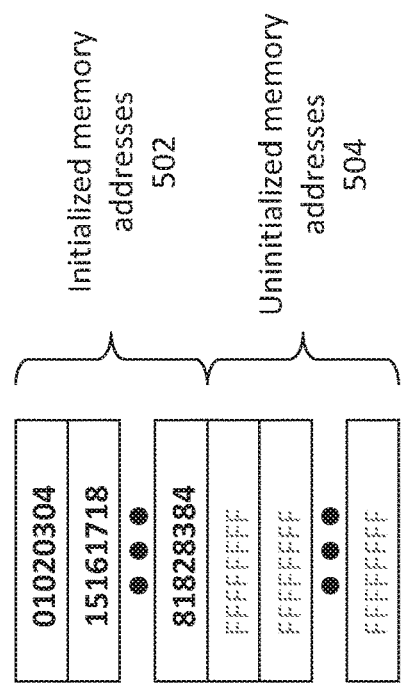

FIGS. 5A and 5B illustrate exemplary memory circuits in accordance with an embodiment of the present invention. For the purposes of illustrating clear examples, FIGS. 5A and 5B will be discussed in connection with authentication system 300 of FIG. 3 and authentication application 400 of FIG. 4.

Referring now to FIG. 5A, memory circuit 302 may encompass all ROMs and RAMS implemented in integrated circuit 100. In an embodiment, RAM in integrated circuit 100 also includes register files and cache memory. In an embodiment, memory circuit 302 may include a combination of addressable memory arrays, explicitly accessible individual registers, or implicitly accessible memory such as cache memory or streaming buffers. In an embodiment, memory circuit 302 is represented by one address map. Authentication application 400 may have access to the address map for memory circuit 302.

As depicted in FIG. 5A, initially memory circuit 302 is divided into initialized memory addresses 502 and uninitialized memory addresses 504. Initialized memory addresses 502 may store embedded firmware. In another suitable arrangement, the embedded firmware stored in memory circuit 302 may be obfuscated by the manufacturer of integrated circuit 100. In an embodiment, a copy of the embedded firmware to be used for authentication by cryptographic application 404 may be encrypted or hashed on the fly by integrated circuit 100 before processing circuitry 102 runs the first cryptographic authentication operation such that the computer system 200 is blind to the 'plaintext' or contents of the embedded firmware. If desired, the uninitialized address spaces may contain null values (e.g., "FFFFFFFF"). The obfuscated embedded firmware may, for example, be authenticated one block at a time by authentication application 400. Obfuscated embedded firmware may, if desired, be discarded after authentication application 400 completes the authentication operation.

Referring now to FIG. 5B, after randomized data 306 is stored in memory circuit 302, memory circuit 302 is divided into initialized addresses 502 that store the embedded firmware and memory addresses initialized with randomized data 506. In an embodiment, randomized data 306 to fill in, flood, or occupy uninitialized memory addresses 504 may be generated by randomized data generating application 402 as described above. In an alternative embodiment, specialized circuitry within processing circuitry 102 may generate randomized data 306 and send a copy of randomized data 306 to computer system 200. For example, PLD circuit 101 itself could pre-fill memory circuit 302 with a non-compressible pattern that inherently takes a long time and essentially the entire address space associated with memory circuit 302 to compute.

One such method is to divide the entire address map of memory circuit 302 into N contiguous blocks of address spaces, fill all of memory circuit 302 with a pseudo-random pattern, and to iteratively compute the value of blocks at random address spaces. In an embodiment, the pseudo-random pattern may be derived from a key for a hash function that is provided by computer system 200. By pre-filling memory circuit 302 with a pattern that is difficult to incrementally compute quickly, or to difficult to compute using a small amount of memory (such as by using dynamic programming techniques or other tricks), attackers may be prevented from hiding a compressed version of an attack code and decompressing it in memory circuit 302.

People skilled in the art would appreciate that in an alternative embodiment where integrated circuit 100 contains multiple processors or processing circuits associated with multiple address maps, the techniques described in this application could be applied to each address map to generate multiple first signatures that are returned to computer system 200. In an embodiment, the multiple first signatures are hashed together or otherwise authenticated to generate a single first signature 310 for integrated circuit 100.

Figure 6:
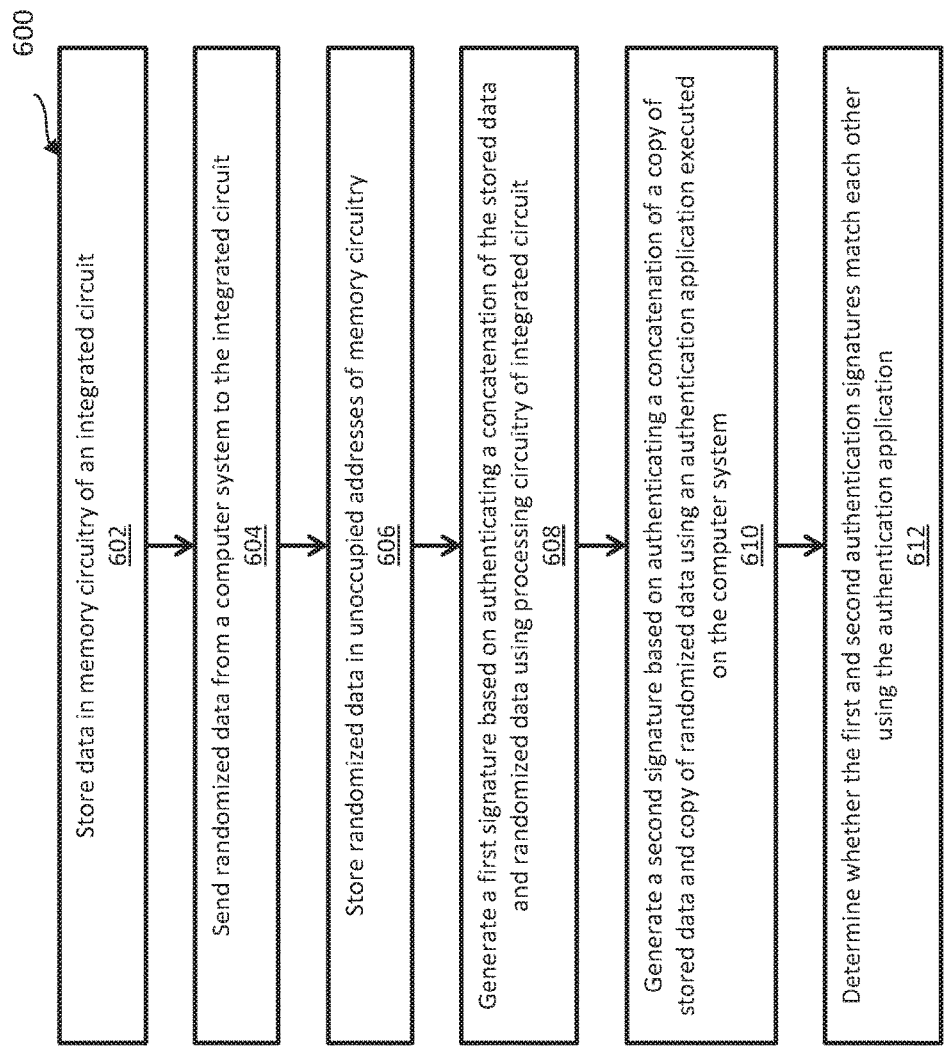
FIG. 6 illustrates an exemplary method of operating an authentication system in accordance with an embodiment of the present invention.

FIG. 6 illustrates an exemplary method of operating an authentication system 300 in accordance with an embodiment of the present invention. For the purposes of illustrating clear examples, FIG. 6 will be discussed in connection with authentication system 300 of FIG. 3 and authentication application 400 of FIG. 4.

Figure 7:
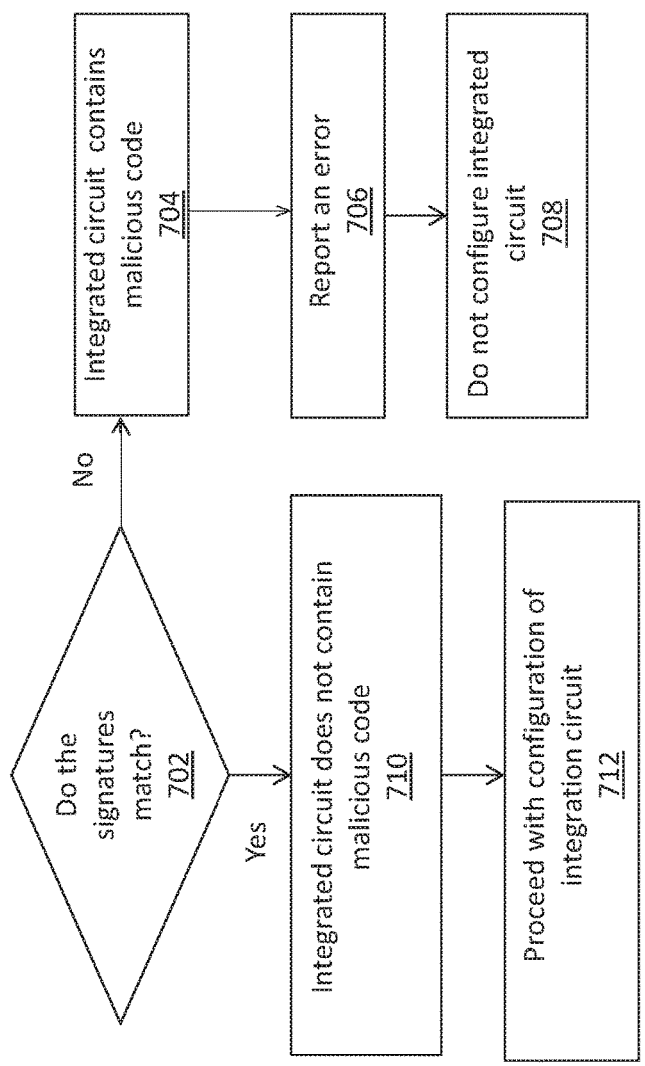
FIG. 7 illustrates an exemplary method of determining the result of authentication of data stored on memory circuit of an integrated circuit in accordance with an embodiment of the present invention.

Referring now to FIG. 6, at step 602 data may be stored in memory circuit 302 of integrated circuit 100. In an embodiment, the stored data may be firmware embedded in memory circuit 302 by the manufacturer of integrated circuit 100. Similarly, the stored data may be a bitstream configuration loaded into memory circuit 302 as described elsewhere in this application. The stored data may occupy only a portion of address space available in memory circuit 302. In an embodiment, the unoccupied portion of memory circuit 302 is uninitialized. For example, FIG. 7 illustrates an exemplary method of generating a Hashed Message Authentication Code (HAMC) based signature in accordance with an embodiment of the present invention.

Returning to FIG. 6, at step 604, randomized data 306 generated by randomized data generation application 402, implemented as a submodule of authentication application 400, may be sent from computer system 200 to integrated circuit 100. In an embodiment, randomized data 306 is received by processing circuitry 102 of integrated circuit 100. In another embodiment, randomized data 306 may be generated by specialized circuitry in integrated circuit 100 as described elsewhere in this application. If desired, authentication application 400 may also send a key, for example a HMAC key, to integrated circuit 100 for authentication purposes.

At step 606, randomized data 306 may be stored in uninitialized addresses 504 of memory circuit 302. In an embodiment, randomized data 306 is stored in memory circuit 302 to flood or occupy all of the unoccupied address space of memory circuit 302 by initializing all uninitialized addresses 504 to bit patterns from randomized data 306. The combination of stored data and randomized data 306 fills up memory circuit 302 and makes the overall data in memory circuit 302 incompressible as any compression operation on the overall data (or portion of the overall data) requires a portion of address space of memory circuit 302 to store the compressed data.

At step 608, first signature 310 may be generated by the integrated circuit by executing a cryptographic authentication operation on a concatenation of the bit patterns of stored data and randomized data 306 in memory circuit 302. For example, the signature may be generated by performing an HMAC function on the concatenation. In an embodiment, the cryptographic authentication operation may be performed by processing circuitry 102 of integrated circuit. For example, the HMAC key may be used by the cryptographic application 404 to execute a HMAC function on the concatenation of firmware and randomized data 306 stored in memory circuit 302 to generate first signature 310. In an embodiment, first signature 310 is sent to computer system 200. For example, processing circuitry 102 may forward first signature 310 along network link 220 connecting integrated circuit 100 and computer system 200.

At step 610, simultaneously or in parallel to generating first signature 310, a second signature may be generated by authentication application 400. The second signature may be generated by cryptographic application 402 performing a cryptographic authentication operation on a concatenation of a copy of randomized data 306 and a secure copy of embedded firmware obtained from a trusted source, for example a manufacturer. The cryptographic authentication operation performed on the concatenation may be a cryptographic operation such as the same HMAC function used to generate the first signature at step 608. In an embodiment, if randomized data 306 is generated by integrated circuit 100, then a copy of randomized data 306 may be received by authentication application 400 along with first signature 310. In an embodiment, a copy of the embedded firmware or data stored on memory circuit 302 may be provided to cryptographic application 402 as a memory image file.

At step 612, comparison and reporting application 408 may compare first signature 310 to the second signature. For example, authentication application 400 may be verifying the embedded firmware to check for Trojan code inserted into the embedded firmware by a malicious user. If Trojan code is inserted into the embedded firmware, the Trojan code will modify the memory space available in memory circuit 302 for randomized data 306. Thus, a hash function performed on a concatenation of the modified embedded firmware and randomized data 306 will yield a signature that is different from a signature obtained from a hash function performed on a concatenation of the original untampered embedded firmware and randomized data 306. A malicious user may insert Trojan code in an embedded firmware by compressing the embedded firmware such that a similar portion of memory is available for randomized data 306 as if the embedded firmware had not been modified. However, even in that scenario a hash function performed on a concatenation of the modified embedded firmware and randomized data 306 will yield a different signature because of the differences in the contents of the stored data itself.

In an alternative embodiment, instead of generating first signature 310, integrated circuit may send the concatenation of firmware and randomized data 306 to authentication application 400. Then, comparison and reporting application 408 compares a concatenation of a copy of randomized data 306 and a secure copy of embedded firmware obtained from a trusted source to the concatenation of firmware and randomized data 306 received from integrated circuit 100. If the two concatenations match then the embedded firmware is clean, otherwise the embedded firmware may be identified as tampered, hacked, or insecure.

A person skilled in the art would appreciate that the same or a substantially similar process may be used to authenticate a concatenation of the embedded firmware and randomized data 306 stored in memory circuit 302 such that the embedded firmware is obfuscated by the manufacturer of integrated circuit 100 or obfuscated on the fly by the integrated circuit.

FIG. 7 illustrates an exemplary method of determining the result of authentication of data stored on memory circuit 302 of integrated circuit 100 in accordance with an embodiment of the present invention. For the purposes of illustrating clear examples, FIG. 7 will be discussed in connection with authentication system 300 of FIG. 3 and authentication application 400 of FIG. 4.

Referring now to FIG. 7, at step 702 comparison and reporting application 408 may determine whether first signature 310 matches the second signature.

At step 710, in response to determining that first signature 310 matches the second signature, comparison and reporting application 408 may establish that the embedded firmware stored in memory circuit 302 of integrated circuit 100 does not contain any malicious code or data, or has not been modified in any manner. In an embodiment, comparison and reporting application 408 may generate an output signal in response to determining that the signatures match. For example, the output signal may be a GUI element or an audio-visual cue. In an embodiment, the output signal may be transmitted using display 212 of computer system 200.

At step 712, comparison and reporting application may instruct processing circuitry 102 to proceed with configuring integrated circuit 100. In an embodiment, configuring integrated circuit 100 is based, at least in part, on the embedded firmware stored in memory circuit 302.

At step 704, in response to determining that first signature 310 does not match the second signature, comparison and reporting application 408 may establish that integrated circuit 100 contains malicious code. In an embodiment, comparison and reporting application 408 may determine that integrated circuit 100 contains malicious code even in the event of first signature 310 being same as second signature, if first signature 310 takes an unusually long time to compute.

At step 706, comparison and reporting application 408 may generate and report an error. For example, the error may be a GUI element or an audio-visual cue. In an embodiment, the error may be transmitted using display 212 of computer system 200.

At step 708, comparison and reporting application 408 may stop or halt processing circuitry 102 from configuring integrated circuit 100. In an embodiment, comparison and reporting application 408 may reject integrated circuit 100 as defective. In an embodiment, comparison and reporting application 408 may store the concatenation of tampered embedded firmware and randomized data 306 for analysis.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of authenticating stored data that is stored on an integrated circuit, the method comprising:

sending, using computing equipment that is separate from the integrated circuit, a first copy of randomized data to a memory circuit on the integrated circuit, wherein the first copy of the randomized data occupies each address of the memory circuit that is unoccupied by the stored data;

generating, using a cryptographic circuit on the integrated circuit, a first digital signature by performing a cryptographic operation on a concatenation of the stored data and the first copy of the randomized data;

generating, using the computing equipment, a second digital signature by performing the cryptographic operation on a concatenation of a secure copy of the stored data and a second copy of the randomized data; and determining, using the computing equipment, whether the first digital signature matches the second digital signature.

2. The method as defined in claim 1, wherein the secure copy of the stored data is provided by a manufacturer of the integrated circuit.

3. The method as defined in claim 2, wherein the memory circuit comprises:

a read-only memory (ROM) circuit, wherein the ROM circuit stores a second randomized data, wherein the second randomized data is embedded in the ROM circuit by the manufacturer of the integrated circuit; and a random access memory (RAM) circuit, wherein the RAM circuit stores the first copy of the randomized data.

4. The method as defined in claim 1, further comprising:

in response to determining that the first digital signature matches the second digital signature, configuring the integrated circuit according to the stored data; and in response to determining that the first digital signature does not match the second digital signature, reporting, using the computing equipment, the second integrated circuit as defective.

5. The method as defined in claim 1, wherein the first and second digital signatures comprise first and second hashed message authentication codes (HMACs), respectively.

6. The method as defined in claim 5, wherein performing the cryptographic operation on the concatenation of the stored data and the first copy of the randomized data comprises:

receiving an HMAC key at the cryptographic circuit from the computing equipment; and executing an HMAC function using the HMAC key and the concatenation of the stored data and the first copy of the randomized data, wherein performing the cryptographic operation on the concatenation of the secure copy of the stored data and the second copy of the randomized data comprises:

executing the HMAC function using the HMAC key and the concatenation of the secure copy of the stored data and the second copy of the randomized data.

7. The method as defined by claim 1, further comprising generating the randomized data using a randomized data generation circuit.

8. The method as defined in claim 7, wherein generating the randomized data comprises:

dividing, using the randomized data generating circuit, an address space of the memory circuit into a plurality of blocks of addresses; and filling, using the randomized data generating circuit, each block in the plurality of blocks of addresses with the randomized data.

9. The method as defined in claim 8, wherein the cryptographic circuit generates a unique digital signature for each block of addresses in the plurality of blocks of addresses and wherein each of the blocks of addresses is selected non-sequentially from the plurality of blocks of addresses.

10. The method as defined in claim 1, wherein the randomized data is an output of a computer-implemented pseudo random number generator on the computing equipment.

11. The method as defined in claim 1, wherein the randomized data is generated at the computing equipment based on an output of a cryptographic function performed on a hash of an output of a computer-implemented pseudorandom number generator and an encryption key.

12. The method as defined in claim 1, further comprising:

obfuscating the stored data on the integrated circuit prior to generating the first digital signature.

13. The method as defined in claim 12, wherein obfuscating the stored data on the integrated further comprises encrypting the stored data with a secret key to generate an encrypted stored data.

14. The method as defined in claim 13, further comprising:

recovering, using the integrated circuit, the stored data from the encrypted stored data after generating the first digital signature.

15. The method as defined in claim 12, wherein obfuscating the stored data further comprises:

performing a one-way hash function on each block of a first copy of the stored data.

16. The method as defined in claim 12, wherein obfuscating the stored data further comprises performing a one-way hash function on the stored data.

17. An integrated circuit that generates a digital signature, the integrated circuit comprising:

a processing circuit;

a memory circuit, wherein stored data and randomized data are stored on the memory circuit, and wherein the randomized data occupies uninitialized memory addresses of the memory circuit that are not occupied by the stored data; and a cryptographic circuit that executes a cryptographic function on a concatenation of the stored data and the randomized data to generate the digital signature.

18. The integrated circuit as defined in claim 17, wherein the processing circuit, the memory circuit, and the encryption circuit are formed in a programmable logic device.

19. A method of authenticating stored data using computing equipment, the method comprising:

sending a first copy of randomized data to a memory circuit on an integrated circuit using a computer-implemented randomized data generation application on the computing equipment, wherein the first copy of the randomized data occupies each address of the memory circuit that is not occupied by the stored data;

receiving a first concatenation of the stored data and the first copy of the randomized data from the integrated circuit using a computer-implemented authentication application on the computing equipment;

generating a second concatenation of a secure copy of the stored data and a second copy of the randomized data using the computer-implemented authentication application, wherein the secure copy is provided by a manufacturer of the integrated circuit; and determining, using a computer-implemented comparison application on the computing equipment, whether the first concatenation matches the second concatenation.

20. The method as defined in claim 19 further comprising:

in response to determining that the first concatenation matches the second concatenation, configuring the integrated circuit to implement a logic design specified by the stored data; and in response to determining that the first concatenation does not match the second concatenation, reporting, using a computer-implemented reporting application on the computing equipment, the second integrated circuit as defective.

* * * * *